(No Model.)
J. H. CORCORAN & L. RUMMEL.
HAY RAKER AND LOADER.
No. 320,227. Patented June 16, 1885.
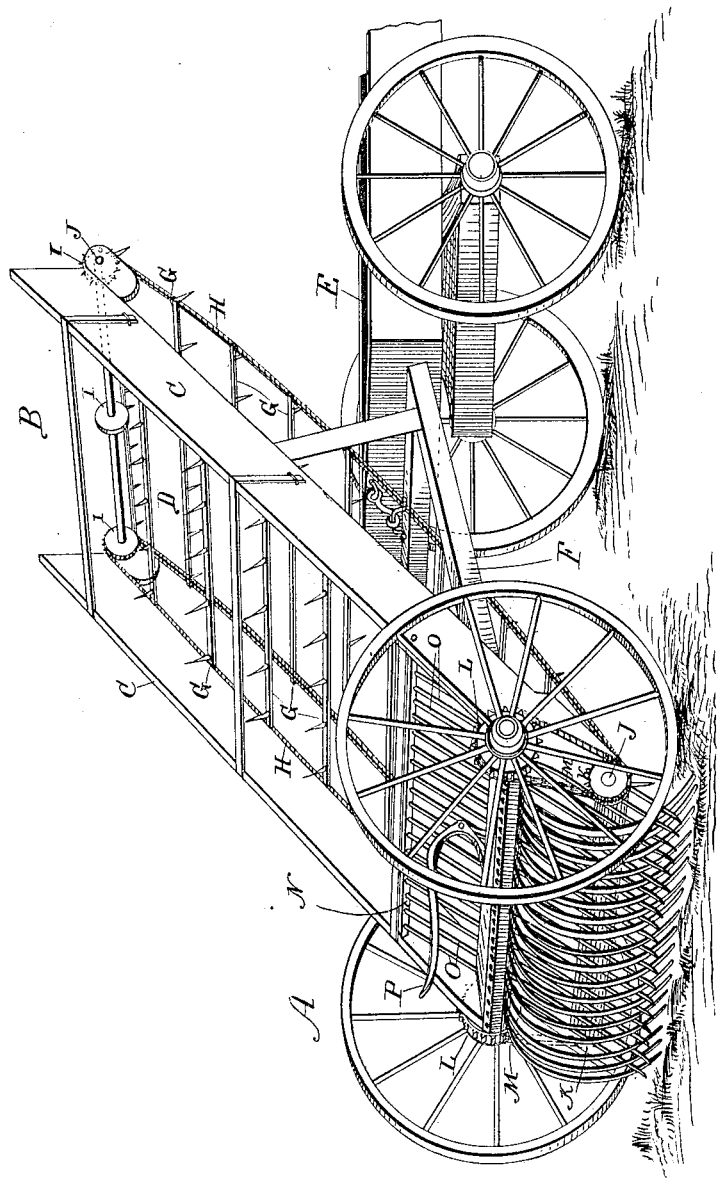
WITNESSES:
Thos. Houghton.
A. G. Lyne
INVENTORS:
J. H. Corcoran
L. Rummel
BY Munn & Co
ATTORNEYS.

UNITED STATES PATENT OFFICE.

J. HUFF CORCORAN AND LUDWIG RUMMEL, OF ALDEN, IOWA.

HAY RAKER AND LOADER.

SPECIFICATION forming part of Letters Patent No. 320,227, dated June 16, 1885.

Application filed May 24, 1884. (No model.)

*To all whom it may concern:*

Be it known that we, J. HUFF CORCORAN and LUDWIG RUMMEL, of Alden, in the county of Hardin and State of Iowa, have invented a new and useful Improvement in Combined Hay Raker and Loader, of which the following is a full, clear, and exact description, reference being had to the annexed drawings, forming part of this specification.

The object of this invention is to provide an attachment for an ordinary farm-wagon by which hay may be raked from the ground after a mowing-machine and elevated and loaded on the wagon while the latter is in motion.

The drawing is a perspective view of the invention.

A represents a two-wheel hay-rake of ordinary construction. To the front of the axle of the rake is connected an elevator, B, consisting of the frame C and traveling apron D, which elevator extends forward at a suitable inclination for supporting its upper end above the rear end of a wagon, E, when the rake-teeth are on the ground. To the under side of the elevator is secured a supporting-frame, F, by which the attachment is connected to the wagon, and which rests on the ground as a support for the elevator when the device is detached from the wagon. The traveling apron consists of a series of connected toothed bars, G, on chain belts H, and it is carried by rollers I on shafts J, supported in the ends of frame C. The lower shaft J is provided at each end with a sprocket-wheel, K, which is geared to a sprocket-wheel, L, on the axle of the rake by a chain belt, M. With this construction, as the wagon is moved forward, the rake-teeth will fill with hay, and the toothed bars of the traveling apron will carry the hay from the rake up the elevator and discharge it on top of the wagon. In order to press the hay down from the rake-teeth against the traveling apron, where it will be readily engaged by the toothed bars G, we provide a cross-bar, N, having a series of straight rods, O, attached thereto, and pivotally secure this bar to the upper side of frame C, above the apron D, with the rods O extended to the rear and between the rake-teeth. The rods O, being made of iron and resting freely on the hay in the rake, will serve to weight the hay down upon the apron. P is a lifting-lever attached to the cross-bar of the rake.

What we claim is—

The combination, with the rake and elevator, of a pivotally-secured bar having a series of rods supported on the elevator for weighting the hay in the rake and pressing it against the elevator-apron, substantially as shown and described.

J. HUFF CORCORAN.
LUDWIG RUMMEL.

Witnesses to J. H. Corcoran's signature:
G. SYMES STEWART,
A. J. MORGAN.

Witnesses to Ludwig Rummel's signature:
BEN P. BIRDSALL,
W. M. COUSIN.